United States Patent
Konno et al.

(10) Patent No.: US 8,798,460 B2
(45) Date of Patent: Aug. 5, 2014

(54) OPTICAL ACCESS SYSTEM, OPTICAL NETWORK UNIT, AND OPTICAL LINE TERMINAL

(75) Inventors: Satoshi Konno, Yokohama (JP); Noboru Oosawa, Yokohama (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 537 days.

(21) Appl. No.: 13/153,012

(22) Filed: Jun. 3, 2011

(65) Prior Publication Data

US 2012/0141119 A1 Jun. 7, 2012

(30) Foreign Application Priority Data

Jun. 7, 2010 (JP) ................. 2010-129688

(51) Int. Cl.
*H04B 10/08* (2006.01)
(52) U.S. Cl.
USPC ................... 398/25; 398/70; 398/75
(58) Field of Classification Search
USPC .......... 398/25, 38, 70–75
See application file for complete search history.

(56) References Cited

U.S. PATENT DOCUMENTS

2005/0197171 A1 9/2005 Son et al.
2009/0263127 A1* 10/2009 Haran et al. ............. 398/38
2010/0220641 A1 9/2010 Son et al.
2012/0177361 A1* 7/2012 Hirano et al. ............. 398/1
2013/0294775 A1* 11/2013 Hirth et al. ............. 398/67

FOREIGN PATENT DOCUMENTS

| JP | P2007-525927 A | 9/2007 |
| JP | 2008-113193 | 5/2008 |
| JP | 2009-260970 | 11/2009 |
| JP | 2009-260970 A | 11/2009 |
| JP | 2009-296231 | 12/2009 |
| JP | 2009-296234 | 12/2009 |
| WO | WO 2005/086383 A1 | 9/2005 |
| WO | WO 2009/051458 A2 | 4/2009 |

* cited by examiner

*Primary Examiner* — Dzung Tran
(74) *Attorney, Agent, or Firm* — Foley & Lardner LLP

(57) ABSTRACT

It is provided an optical access system, comprising an optical line terminal which is coupled to another network and optical network units which are coupled to the optical line terminal and to a plurality of user terminals. Each of the optical network units obtains a capacity of a buffer included in the each of the optical network unit and a link speed between the each of the optical network units and one of the plurality of user terminals that is coupled to the each of the optical network units; determines a sleep time based on the obtained capacity and the obtained link speed in a case where no communication frames are transmitted for a given period of time from any one of the plurality of user terminals and the optical line terminal; and sets in a sleep state for the determined sleep time.

3 Claims, 6 Drawing Sheets

| BUFFER CAPACITY UNI LINK SPEED | 1G Bit | 100M Bit | 10M Bit |
|---|---|---|---|
| 1Gbit/s | 1s | 0.1s | 0.01s |
| 100Mbit/s | 10s | 1s | 0.1s |
| 10Mbit/s | 100s | 10s | 1s |

OPTICAL ACCESS SYSTEM, OPTICAL NETWORK UNIT, AND OPTICAL LINE TERMINAL

CLAIM OF PRIORITY

The present application claims priority from Japanese patent application JP 2010-129688 filed on Jun. 7, 2010, the content of which is hereby incorporated by reference into this application.

BACKGROUND OF THE INVENTION

This invention relates to an optical access system, and more particularly, to an optical access system in which an optical network unit shifts to a sleep state.

In recent years, optical networks are being introduced in order to deal with an increase in the speed and bandwidth of communication networks. An optical network is a system in which one optical line terminal (OLT) and one optical network unit (ONU) communicate with each other via an optical fiber.

Passive optical networks (PONs) are a type of optical network. A passive optical network (PON) system is an optical network system in which one OLT and a plurality of ONUs form a star network, with an optical splitter interposed between the OLT and the ONUs. Typical standards for PONs include Ethernet PON (EPON), which has been standardized by IEEE 802.3.

Uplink frames which are transmitted from the ONUs to the OLT and downlink frames which are transmitted from the OLT to the ONUs are each multiplexed by wave division multiplexing (WDM). A downlink frame is received by every ONU coupled by an optical fiber. Each ONU refers to destination information contained in the preamble part of the downlink frame, and discards the downlink frame if the frame is not destined to itself. An uplink frame in a PON, on the other hand, is multiplexed by time division multiple access (TDMA) to be used for communication.

The communication speed of PONs has been 64 kbit/second at first. In place of systems that handle this low-speed signal, broadband PON (BPON) systems in which ATM cells with a fixed length are transmitted/received at approximately 600 Mbit/second at maximum, EPON systems in which variable-length packets of Ethernet are transmitted/received at approximately 1 Gbit/second at maximum, or even faster gigabit-capable PON (GPON) systems which handle signals of about 2.4 Gbit/second are now being introduced. A further faster PON capable of using signals of 10 Gbit/second to 40 Gbit/second is demanded to be realized in the future.

With the communication speed improved, the power consumption of a relay device along a transmission path is on the rise. A large number of ONUs, which are installed in the homes of and on the premises of subscribers, are set up on a network. On the other hand, an individual ONU needs a band allocated for its use for a shorter period of time than the OLT and a host switch group do. The ONU is thus left idle wasting power during a period in which the ONU is not communicating.

JP 2008-113193 A, for example, discloses a method of cutting power consumption in which, in order to reduce power consumption during a non-communication period of an ONU, function blocks within the ONU are set to a low power consumption mode if terminal equipment (TE) is not coupled to the ONU via a LAN cable.

JP 2009-260970 A, for example, discloses a method involving setting an ONU to a sleep state through a procedure in which a sleep time request of the ONU is granted by the OLT.

As described above, the increased demand for high-speed, large-capacity communication of recent years has put the power consumption of a relay device along a transmission path such as an ONU on the rise, and a way to make the relay device operate on low power is being looked for. The technology disclosed in JP 2008-113193 A is a technology of monitoring only for whether or not the TE is coupled to a LAN port, and shifting to and returning from the low power consumption mode in accordance with the monitoring result. The technology disclosed in JP 2008-113193 A therefore cannot reduce the power consumption of the ONU once the TE is coupled to the ONU, and lets the ONU consume as much power as in normal operation when the ONU is not actually communicating.

The technology disclosed in JP 2009-260970 A has an additional procedure in which an ONU shifts to a sleep state during a non-communication period, and is thus capable of reducing the power consumption of an ONU with the TE coupled thereto during a non-communication period. However, with the technology disclosed in JP 2009-260970 A, the ONU remains in a sleep state only for a given length of sleep time and, when a short sleep time is set, for example, the ONU frequently repeats the shift to and recovery from a sleep state, which limits the effect of the technology in reducing the power consumption of the ONU.

SUMMARY OF THE INVENTION

This invention has been made in view of the above, and an object of this invention is to provide a PON system capable of reducing needless power consumption in end-user traffic, particularly in the upstream direction, by selecting for an ONU that is in a non-communication state as long a sleep time as possible based on the UNI link speed between the ONU and TE and on the capacity of a queue buffer that is provided in the ONU, and by letting the ONU shift to a sleep state and recover from the sleep state after the selected sleep time.

A representative aspect of this invention is as follows. That is, there is provided an optical access system, comprising an optical line terminal which is coupled to another network and optical network units which are coupled to the optical line terminal and to a plurality of user terminals. Each of the optical network units obtains a capacity of a buffer included in the each of the optical network unit and a link speed between the each of the optical network units and one of the plurality of user terminals that is coupled to the each of the optical network units; determines a sleep time based on the obtained capacity and the obtained link speed in a case where no communication frames are transmitted for a given period of time from any one of the plurality of user terminals and the optical line terminal; and sets in a sleep state for the determined sleep time.

According to the aspect of this invention, the power consumption of an ONU during a non-communication period can be reduced by allowing the ONU to select as long a sleep time as possible based on its own link speed and queue buffer capacity.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

An embodiment of this invention is described in detail below.

Figure 1:
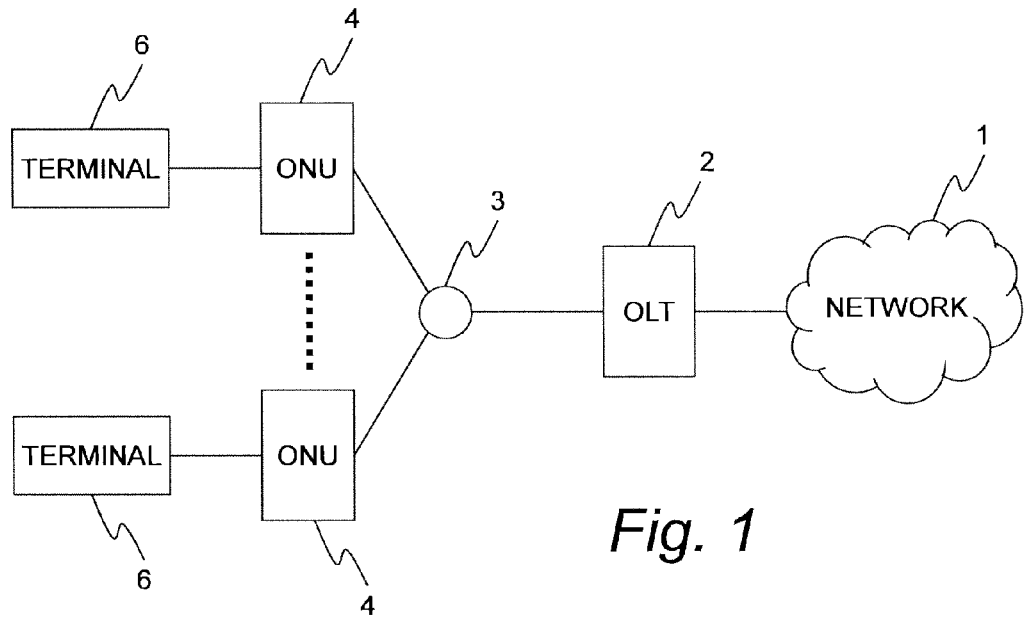
FIG. 1 is a block diagram illustrating a passive optical network (PON) system according to an embodiment of this invention.

FIG. 1 is a block diagram illustrating a passive optical network (PON) system according to the embodiment of this invention.

The PON system of FIG. 1 includes a core network (hereinafter, referred to as network) 1, an optical line terminal (OLT) 2, an optical splitter 3, optical network units (ONUs) 4, and user terminals (hereinafter, referred to as terminals) 6. The terminals 6 are coupled to the ONUs 4. While only two ONUs 4 and two terminals 6 are illustrated in FIG. 1, in practice, more than two ONUs 4 may be coupled via the optical splitter 3 to the OLT 2 in a similar manner. The OLT 2 is coupled to the network 1 and to the optical splitter 3.

The OLT 2 and ONUs 4 of FIG. 1 communicate with each other using optical signals that are multiplexed by wavelength division multiplexing. Communication in the upstream direction and communication in the downstream direction therefore do not collide with each other. On the other hand, the plurality of ONUs 4 use the same transmission wavelength for communication, and the OLT 2 therefore times the optical transmission of each ONU 4 in a manner that prevents the optical transmission of one ONU 4 from overlapping with the optical transmission of another ONU 4.

Figure 2:
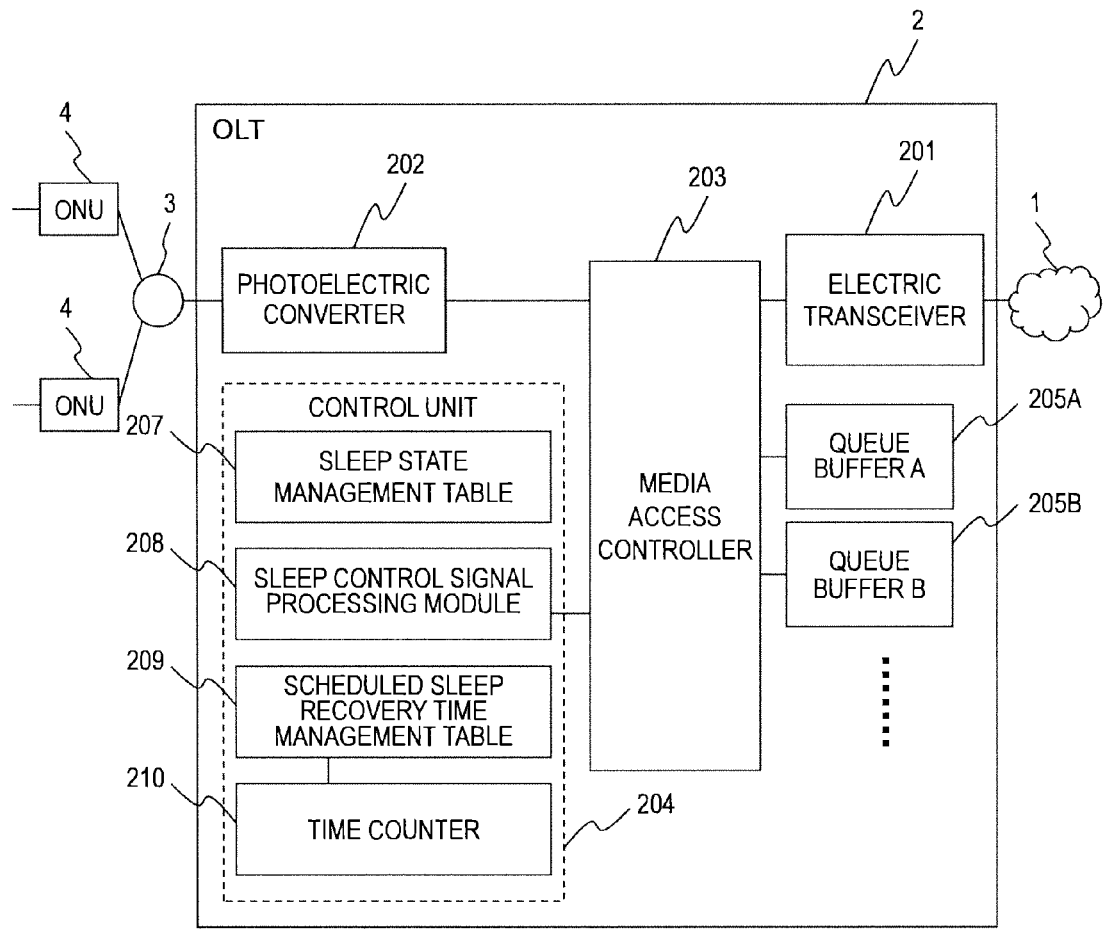
FIG. 2 is a block diagram illustrating a configuration of an optical line terminal (OLT) according to the embodiment of this invention.

FIG. 2 is a block diagram illustrating a configuration of the OLT 2 according to the embodiment of this invention.

The OLT 2 includes an electric transceiver 201, a photoelectric converter 202, a Media Access Controller 203, a control unit 204, a queue buffer 205A, and a queue buffer 205B.

The electric transceiver 201 is a device that communicates with a relay device included in the network 1 by means of electrical signals. The photoelectric converter 202 is a device for communicating with the ONUs 4 by means of optical signals. The photoelectric converter 202 converts an optical signal into an electrical signal, and converts an electrical signal into an optical signal.

The Media Access Controller 203 is a device for controlling data communication that is held while the OLT 2 is in operation. The control unit 204 is a device for controlling function blocks within the OLT 2.

The queue buffer 205A and the queue buffer 205B are buffers for storing traffic data of a queue A and traffic data of a queue B, respectively. The queue buffer 205A and the queue buffer 205B are an example of a plurality of queue buffers provided in a number that is determined by the need of the OLT 2. The queue buffer 205A and the queue buffer 205B are collectively referred to as queue buffers 205.

The control unit 204 includes a sleep control signal processing module 207, a sleep state management table 208, a scheduled sleep recovery time management table 209, and a time counter 210.

The sleep control signal processing module 207 generates and analyzes frames for shifting the ONUs 4 to a sleep state and returning the ONUs 4 from a sleep state. The sleep state management table 208 indicates whether or not the ONUs 4 are in a sleep state.

The scheduled sleep recovery time management table 209 holds information for each ONU 4 that indicates when to recover from a sleep state. The time counter 210 keeps time and counts a given length of time.

The sleep control signal processing module 207 may be a program executed by a processor or the like that is provided in the OLT 2. The sleep state management table 208 and the scheduled sleep recovery time management table 209 may be stored in a memory or the like that is provided in the OLT 2.

An uplink frame sent from one of the ONUs 4 is received by the photoelectric converter 202 and converted into an electrical signal. The Media Access Controller 203 holds, as path information, the MAC address of the uplink frame sent from the ONU 4 in association with sender ONU information, which is attached to the frame's preamble part. The uplink frame sent from the ONU 4 is then transmitted to the network 1 from the electric transceiver 201.

A downlink frame sent from the network 1 is received by the electric transceiver 201. The Media Access Controller 203 refers to the MAC address that is attached to the downlink frame sent from the network 1 and, based on the path information held in advance, attaches identification information of one of the ONUs 4 that is the frame's destination to the preamble part of the downlink frame. The photoelectric converter 202 then converts the downlink frame sent from the network 1 into an optical signal, and transmits the optical signal to the ONUs 4.

The Media Access Controller 203 has the switching function described above. The identification information of the ONUs 4 in this embodiment can be, for example, logical link ID (LLID) defined by IEEE 802.3ah.

Figure 3:
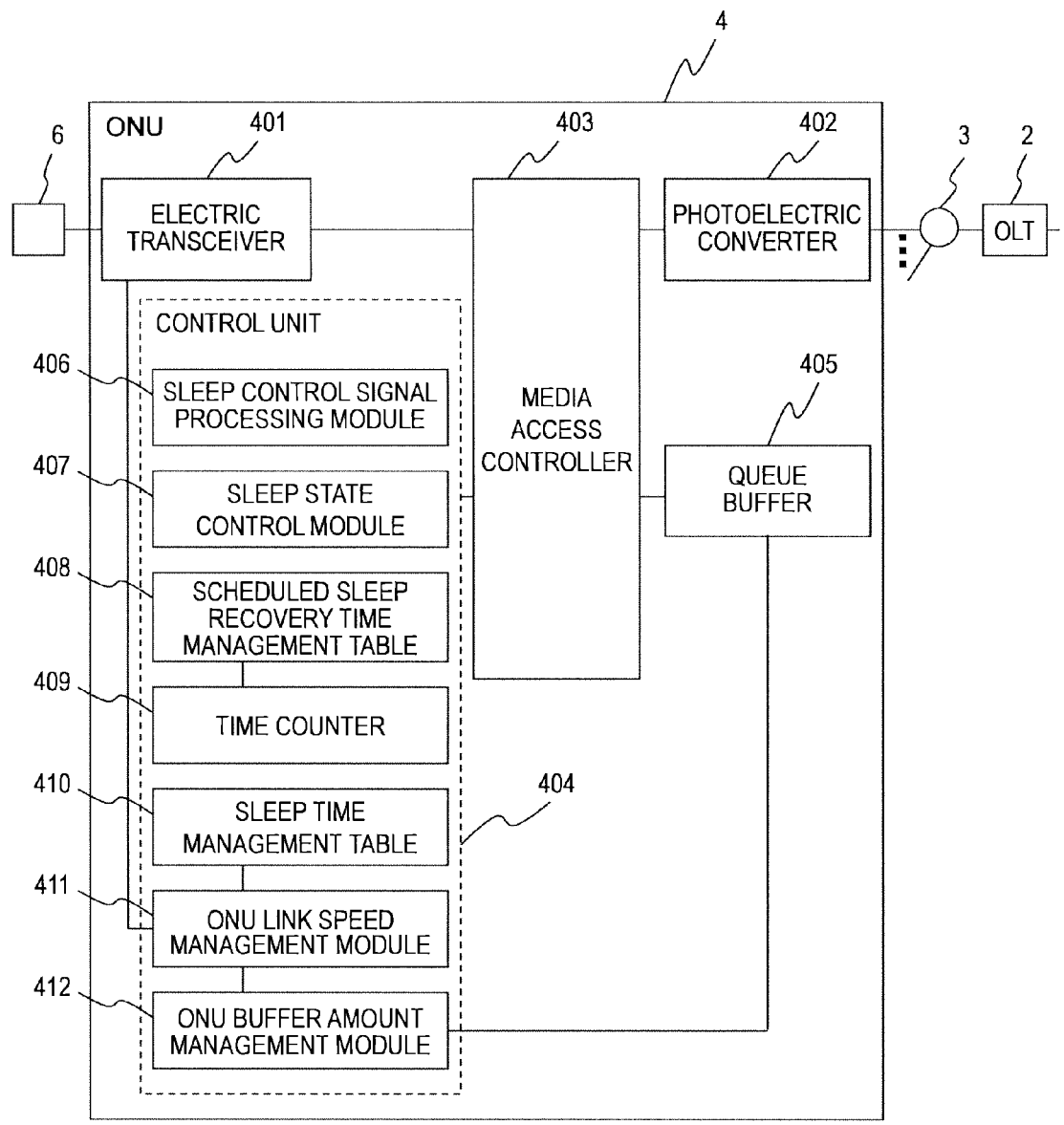
FIG. 3 is a block diagram illustrating a configuration of an optical network unit (ONU) according to the embodiment of this invention.

FIG. 3 is a block diagram illustrating a configuration of the ONUs 4 according to the embodiment of this invention.

Each ONU 4 includes an electric transceiver 401, a photoelectric converter 402, a Media Access Controller 403, a control unit 404, and a queue buffer 405.

The electric transceiver 401 is a device that communicates with the coupled terminal 6 by means of electrical signals. The photoelectric converter 402 is a device for communicating with the OLT 2 by means of optical signals. The photoelectric converter 402 converts an optical signal into an electrical signal, and converts an electrical signal into an optical signal.

The Media Access Controller 403 is a device that controls data communication when the ONU 4 is in a normal state and in a sleep state. The controller 404 is a device that controls function blocks within the ONU 4. The queue buffer 405 is a buffer for storing traffic data.

The controller 404 includes a sleep control signal processing module 406, a sleep state control module 407, a scheduled sleep recovery time management table 408, a time counter 409, a sleep time management table 410, an ONU link speed management module 411, and an ONU buffer amount management module 412.

The sleep control signal processing module 406 generates and analyzes sleep control signals exchanged with the OLT 2. The sleep state control module 407 controls the shift to and recovery from a sleep state.

The scheduled sleep recovery time management table 408 holds the time to recover from a sleep state. The time counter 409 keeps time and counts a given length of time.

The sleep time management table 410 is a table defined in advance based on the UNI link speed between the ONU 4 and the terminal 6 and on the queue buffer capacity. The ONU link speed management module 411 is coupled to the electric transceiver 401 to monitor the UNI link speed between the ONU 4 and the terminal 6. The ONU buffer amount management module 412 is coupled to the queue buffer 405 to monitor the queue buffer capacity of the ONU 4.

A sleep state of the ONU 4 in this invention is a state in which power supply to the photoelectric converter 402 is stopped to suspend communication with the photoelectric converter 202 of the OLT 2. In a sleep state, the Media Access Controller 403 shuts down all functions but a function of storing in the queue buffer 405 uplink frames received by the electric transceiver 401, and some of the functions implemented by the control unit 404.

In a sleep state, based on the scheduled sleep recovery time management table 408, the sleep state control module 407 monitors whether or not the time counter 409 has reached a scheduled sleep recovery time that has been specified by the sleep control signal processing module 207 of the OLT 2.

Figure 4:
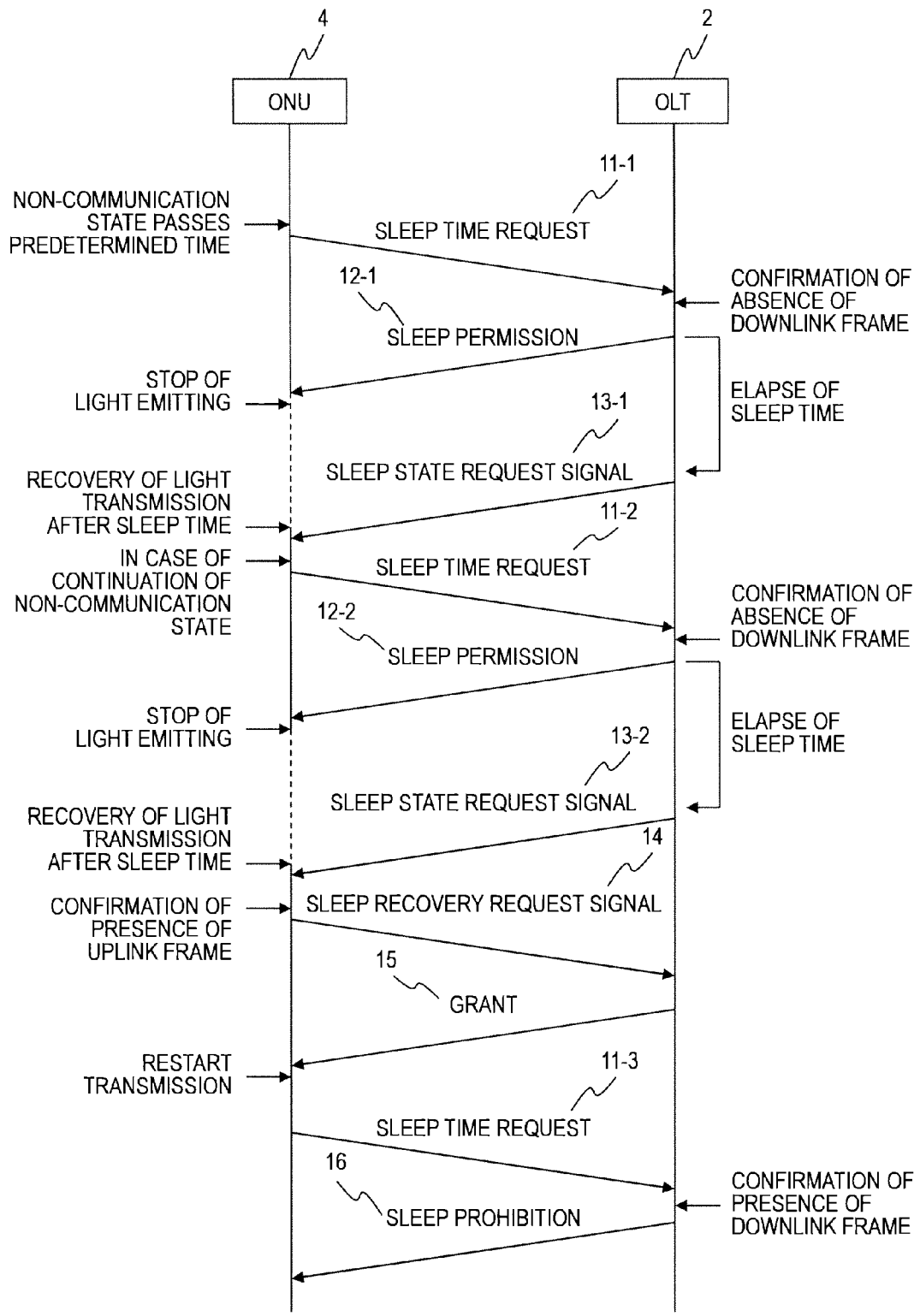
FIG. 4 is a sequence diagram illustrating processing for shifting the ONU to a sleep state and returning the ONU from the sleep state according to the embodiment of this invention.

FIG. 4 is a sequence diagram illustrating processing for shifting one of the ONUs 4 to a sleep state and returning the ONU 4 from the sleep state according to the embodiment of this invention.

Sleep control signals exchanged between the ONU 4 and the OLT 2 include a sleep time request signal 11, a sleep permission signal 12, a sleep state request signal 13, a sleep recovery request signal 14, a grant signal 15, and a sleep prohibition signal 16.

When the ONU 4 is in a normal state, the sleep state control module 407 monitors information on the passage of uplink frames and downlink frames which is notified from the control converter 404 and, each time an uplink frame or a downlink frame passes, refers to the time counter 409, to thereby measure the length of a non-communication state in which no uplink frames and no downlink frames pass.

In the case where the non-communication state lasts longer than a given period of time, the sleep state control module 407 causes the sleep control signal processing module 406 to generate the sleep time request signal 11 (11-1) via the control unit 404.

The generated sleep time request signal 11-1 contains the identification information of the ONU 4, a sleep time, which is obtained by a method described later, a value of the time counter 409 that indicates the time when the sleep time request signal 11-1 has been generated, and information that indicates the absence of uplink frames in the queue buffer 405.

The information indicating the absence of uplink frames in the queue buffer 405 can be, for example, one that is transmitted in a report frame defined in Multi-Point Control Protocol (MPCP) of IEEE 802.3ah.

The photoelectric converter 402 transmits the sleep time request signal 11-1 in response to an instruction from the sleep state control module 407. When the control unit 204 of the OLT 2 receives the sleep time request signal 11-1 from the photoelectric converter 402, the sleep control signal processing module 207 analyzes the sleep time request signal 11-1.

Based on the identification information of the ONU 4 that is contained in the sleep time request signal 11-1, the sleep control signal processing module 207 identifies the ONU 4 that is the sender of the sleep time request signal 11-1. Then, the control unit 204 refers to the queue buffers 205 to check whether or not there are downlink frames destined to the identified ONU 4.

In the case where the queue buffers 205 contain no downlink frames destined to the identified ONU 4, the control unit 204 causes the sleep control signal processing module 207 to generate the sleep permission signal 12 (12-1) and sends the generated sleep permission signal 12-1 to the identified ONU 4 in order to permit the ONU 4 to enter a sleep state. The control unit 204 also stores in the sleep state management table 208 information to the effect that the identified ONU 4 is in a sleep state.

The control unit 204 further obtains a value of the time counter 210 that indicates the time when the sleep permission signal 12-1 has been generated. A time counter value at a scheduled sleep recovery time is calculated by adding the sleep time that is contained in the sleep time request signal 11-1 to the value that is obtained from the time counter 210 as the time of generation of the sleep permission signal 12-1. The control unit 204 stores the thus calculated scheduled sleep recovery time in the scheduled sleep recovery time management table 209.

The control unit 204 further calculates a value of the time counter 409 of the ONU 4 that indicates the time when the ONU 4 is to recover from the sleep state, and stores the calculated value in the scheduled sleep recovery time management table 209. In the case where the time counter 210 of the OLT 2 and the time counter 409 of the ONU 4 are synchronized with each other in advance, the value of the time counter 409 of the ONU 4 at the recovery from sleep may be calculated by adding the scheduled sleep recovery time to the value of the time counter 210 that indicates the time of generation of the sleep permission signal 12-1.

The generated sleep permission signal 12-1 contains the identification information of the ONU 4 which is to shift to a sleep state and a value of the time counter 409 of the ONU 4 that indicates the time when the ONU 4 is scheduled to recover from the sleep state (scheduled sleep recovery time).

When the sleep permission signal 12-1 is received from the photoelectric converter 202, the control unit 404 causes the sleep control signal processing module 406 to analyze the sleep permission signal 12-1. In the case where the analysis reveals that the control unit 204 of the OLT 2 has permitted the ONU 4 to shift to a sleep state, the control unit 404 stores in the sleep state control module 407 a value of the time counter 409 that is contained in the sleep permission signal 12-1 as a scheduled sleep recovery time.

After storing the scheduled sleep recovery time, the control unit 404 shifts to a sleep state. Specifically, the control unit 404 exerts control in a manner that stops power supply to the photoelectric converter 402. The uplink frame received by the electric transceiver 401 from the coupled terminal 6 is transferred from the electric transceiver 401 to the queue buffer 405. The control unit 404 then stops the operation of the ONU 4 except this transfer function and functions necessary for procedures executed at the time of recovery from the sleep state.

During a period in which the ONU 4 is in a sleep state, uplink frames sent from the terminal 6 are stored in the queue buffer 405. The sleep state control module 407 monitors the value of the time counter 409 until the time counter 409 reaches the scheduled sleep recovery time described above.

When the time counter 409 reaches the scheduled sleep recovery time, the sleep state control module 407 shifts the control unit 404 to a normal operation state. Back in the normal operation state, the control unit 404 exerts control in a manner that resumes power supply to the photoelectric converter 402. This causes the photoelectric converter 402 to start operating, and establishes communication between the photoelectric converter 402 of the ONU 4 and the photoelectric converter 202 of the OLT 2.

When communication is established between the photoelectric converter 402 of the ONU 4 and the photoelectric converter 202 of the OLT 2, the control unit 204 of the OLT 2 generates the sleep state request signal 13 (13-1) in order to make an inquiry to the ONU 4 about whether or not the ONU 4 is to shift to another sleep state. The control unit 204 causes the photoelectric converter 202 to transmit the sleep state request signal 13-1 to the photoelectric converter 402 of the ONU 4 that has been in a sleep state.

Receiving the sleep state request signal 13-1 from the photoelectric converter 202, the control unit 404 of the ONU 4 refers to the queue buffer 405 to determine whether or not any uplink frame has been received during the sleep state. In the case where still no uplink frames have been received during the sleep state, the control unit 404 generates a sleep time request signal 11-2 by the same procedure that is described above as a way to generate the sleep time request signal 11-1, in order to make an inquiry to the OLT 2 about whether or not the ONU 4 is to shift to a sleep state again. The generated sleep time request signal 11-2 is transmitted to the photoelectric converter 202 of the OLT 2.

The control unit 204 receives the sleep time request signal 11-2 from the photoelectric converter 202, and determines whether or not there are downlink frames destined to the ONU 4 that has transmitted the sleep time request signal 11-2. In the case where there are no downlink frames destined to the ONU 4 that has transmitted the sleep time request signal 11-2, the control unit 204 generates a sleep permission signal 12-2 by the same procedure that is described above as a way to generate the sleep permission signal 12-1. The sleep permission signal 12-2 is sent to the ONU 4, to thereby shifting the ONU 4 to a sleep state.

In the case where at least one of an uplink frame to be transmitted to the electric transceiver 401 of the ONU 4 and a downlink frame to be transmitted to the electric transceiver 201 of the OLT 2 is absent, the procedures described above in regard to the sleep state request signal 13, the sleep time request 11, and the sleep permission signal 12 are repeated and the ONU 4 shifts to a sleep state intermittently.

Receiving a sleep state request signal 13-2, the control unit 404 refers to the queue buffer 405 to determine whether or not there are uplink frames transmitted from the terminal 6. In the case where an uplink frame is in the queue buffer 405, the control unit 404 causes the sleep control signal processing module 406 to generate the sleep recovery request signal 14 in order to send to the OLT 2 a message to the effect that there is no need to shift to a sleep state. The control unit 404 causes the photoelectric converter 402 to transmit the sleep recovery request signal 14 to the OLT 2.

The sleep recovery request signal 14 contains an ONU identification signal of the ONU 4 and information that indicates the presence of an uplink frame in the queue buffer 405. The information indicating the presence of an uplink frame in the queue buffer 405 can be, for example, information that is transmitted in a report frame defined in MPCP of IEEE 802.3ah.

The control unit 204 receives the sleep recovery request signal 14 from the photoelectric converter 402, and causes the sleep control signal processing module 207 to analyze the received sleep recovery request signal 14. Based on the result of the analysis, the control unit 204 obtains the message to the effect that an uplink frame that is to pass through the ONU 4 is staying in the ONU 4, and then stores information indicating that the ONU 4 is in a normal state in the sleep state management table 208. The control unit 204 also deletes from the scheduled sleep recovery time management table 209 the scheduled sleep recovery time information of the ONU 4 that has sent the sleep recovery request signal 14.

After those procedures described above are completed, the control unit 204 uses a procedure set while the ONU 4 is operating normally to transmit the signal transmission timing signal 15 (hereinafter, referred to as grant signal 15) to the control unit 404. Receiving the grant signal 15, the control unit 404 transmits uplink frames stored in the queue buffer 405 to the photoelectric converter 202 from the photoelectric converter 402 as in normal operation.

When the sleep time request signal 11 described above is received, the control unit 204 refers to the queue buffers 205 to determine whether or not there are downlink frames destined to the ONU 4. In the case where there are downlink frames destined to the ONU 4, the control unit 204 causes the sleep control signal processing module 207 to generate the sleep prohibition signal 16 in order to prevent the ONU 4 from shifting to a sleep state.

The sleep prohibition signal 16 contains information for identifying the ONU 4 that is to recover from a sleep state and return to a normal state.

While the sleep prohibition signal 16 is being generated, the control unit 204 stores information indicating that the ONU 4 is in a normal state in the sleep state management table 208. The control unit 204 also deletes the scheduled sleep recovery time information of the ONU 4 from the scheduled sleep recovery time management table 209. After completing those procedures, the control unit 204 transmits the sleep prohibition signal 16 from the photoelectric converter 202.

Receiving the sleep prohibition signal 16 from the photoelectric converter 202, the control unit 404 causes the sleep control signal processing module 406 to analyze the sleep prohibition signal 16. In the case where the result of the analysis reveals the presence of a downlink frame that is to pass through the ONU 4 in the OLT 2, the control unit 404 uses a procedure set during normal operation to cause the photoelectric converter 402 to receive a downlink frame transmitted from the photoelectric converter 202. The received downlink frame is transmitted to the terminal 6 from the electric transceiver 401.

Figure 5:
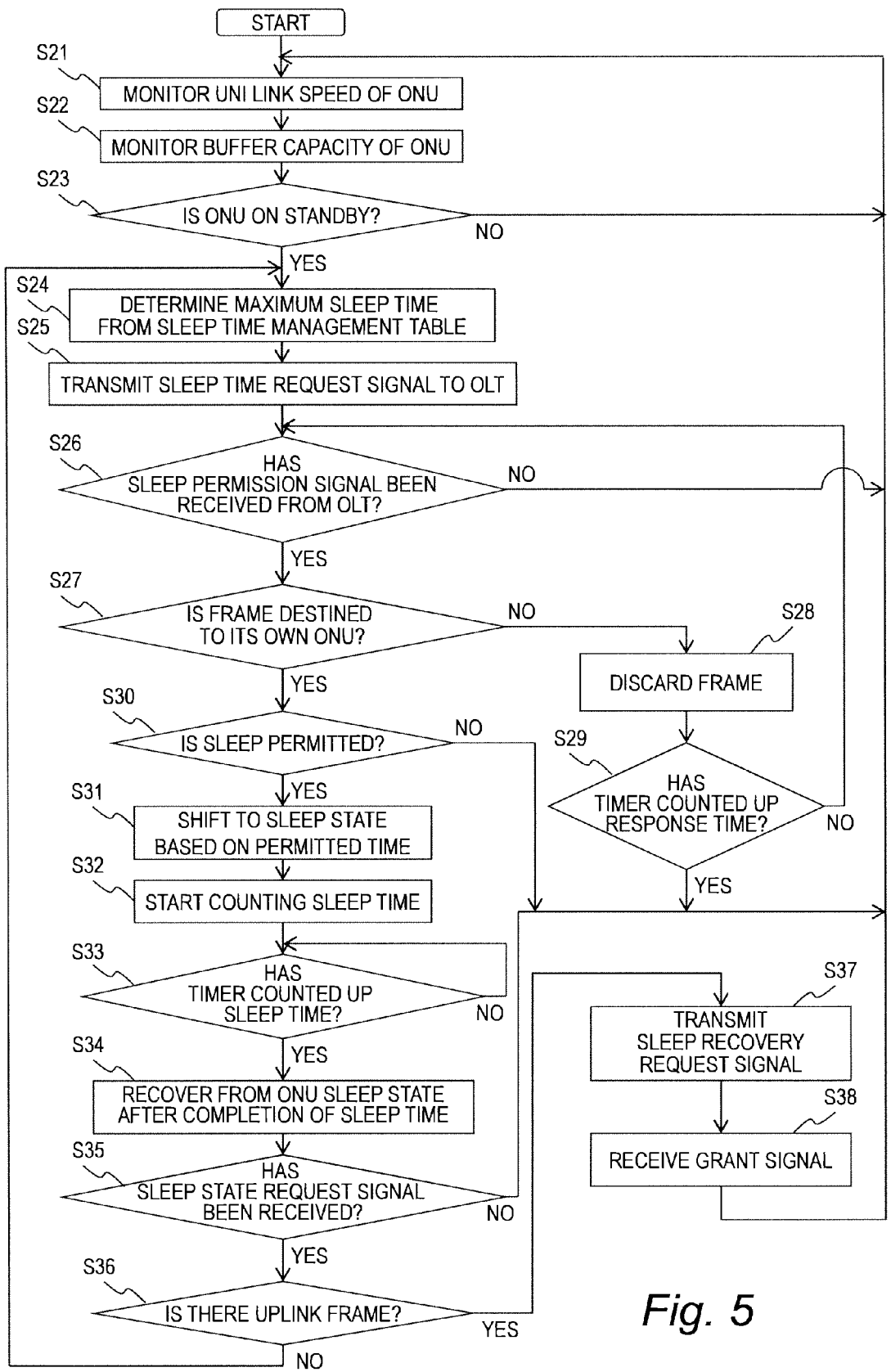
FIG. 5 is a flow chart illustrating processing of the ONU to shift to and returning from a sleep state according to the embodiment of this invention.

FIG. 5 is a flow chart illustrating processing that is executed by each ONU 4 to shift to and return from a sleep state according to the embodiment of this invention.

In the initial process (start) of the flow chart of FIG. 5, the ONU 4 is in a normal state. A normal state in the case where the PON system of this embodiment is an EPON system is a state where a link has been established between the photoelectric converter 202 of the OLT 2 and the photoelectric converter 402 of the ONU 4, the registration of the ONU 4 to the OLT 2 has been finished, and continuity between the OLT 2 and the ONU 4 can be established. At the beginning of the flow chart of FIG. 5, the ONU 4 has not shifted to a sleep state.

After the processing of FIG. 5 is started, the ONU 4 uses the ONU link speed management module 411 and the ONU buffer amount management module 412 to periodically monitor its own UNI link speed and queue buffer capacity (S21 and S22). By monitoring the UNI link speed and the queue buffer capacity, the ONU 4 determines a sleep time from among values of the sleep time management table 410, which is described later.

While the ONU 4 is in a normal state, the sleep state control module 407 of the ONU 4 determines whether or not a non-communication state of the ONU 4 has lasted a given period of time (S23). In the case where the non-communication state has not lasted the given period of time and the OLT 2 and the ONU 4 are communicating, the ONU 4 returns to S21. The ONU 4 repeats the processing of S21 to S23 in a normal state.

When it is determined in S23 that the non-communication state of the ONU 4 has lasted the given period of time, the sleep state control module 407 refers to the sleep time management table 410 via the control unit 404 to determine a maximum sleep time (S24). The sleep state control module 407 determines a maximum sleep time in S24 based on the UNI link speed and the queue buffer capacity that have been obtained in S21 and S22, respectively. Details of the sleep time management table 410 are described later with reference to FIG. 7.

Thereafter, the control unit 404 causes the sleep control signal processing module 406 to generate the sleep time request signal 11, and transmits the generated sleep time request signal 11 from the photoelectric converter 402 to the photoelectric converter 202 (S25). After transmitting the sleep time request signal 11 in S25, the sleep state control module 407 refers to the value of the time counter 409 and starts counting how much time passes until a signal is received from the OLT 2.

The sleep state control module 407 determines whether or not a signal is sent from the OLT 2 until the time counter 409 of the ONU 4 counts up a given response time (S26). In the case where the time counter 409 of the ONU 4 has counted up the given response time but the OLT 2 still has not sent a signal, the ONU 4 determines that the shift to a sleep state has been denied and returns to a normal state. In other words, the ONU 4 returns to S21 and S22.

In the case where the ONU 4 returns to a normal state from S26, the sleep state control module 407 starts counting anew how long the ONU 4 remains in a non-communication state, and measures the length of time in which no uplink frame or downlink frame passes. When it is determined in S23 that the non-communication state where no uplink frame or downlink frame passes has lasted the given period of time, the sleep state control module 407 executes the procedures of S24 and S25 described above to refer to the sleep time management table 410, determine a maximum sleep time, and transmit the sleep time request signal 11. Those processing steps are repeatedly executed until a signal is received from the OLT 2.

When a signal from the OLT 2 is received in S26 by the photoelectric converter 402, the photoelectric converter 402 transmits the received signal to the Media Access Controller 403. The Media Access Controller 403 determines whether or not the received signal is destined to its own ONU 4 (S27).

When the Media Access Controller 403 determines in S27 that the signal is destined to other ONUs 4 than its own ONU 4, the sleep state control module 407 discards the received signal (S28). The sleep state control module 407 then refers to the time counter 409 of the ONU 4 to determine whether or not the time counter 409 of the ONU 4 has counted up the given response time (S29).

When it is determined in S29 that the time counter 409 of the ONU 4 has not counted up the given response time, the sleep state control module 407 returns to S26 to wait further for a signal destined to its own ONU 4. When it is determined in S29 that the time counter 409 of the ONU 4 has counted up the given response time, the ONU 4 returns to S21 and S22 and returns to a normal state.

When the ONU 4 enters a normal state after S29, the sleep state control module 407 starts counting anew how long the ONU 4 remains in a non-communication state, and uses the same procedures as in S21 to S25 described above to repeatedly request the OLT 2 for a shift to a sleep state.

When the Media Access Controller 403 determines in S27 that the sleep permission signal 12 destined to its own ONU 4 has been received from the OLT 2, the control unit 404 causes the sleep control signal processing module 406 to analyze the received signal. Based on the result of the analysis made by the sleep control signal processing module 406, the control unit 404 determines whether or not the received signal is the sleep permission signal 12 (S30).

When it is determined in S30 that the received signal is not the sleep permission signal 12, the ONU 4 returns to a normal state.

When it is determined in S30 that the received signal is the sleep permission signal 12, it means that the control unit 204 of the OLT 2 has permitted the ONU 4 to shift to a sleep state, and the control unit 404 of the ONU 4 thus stores a scheduled sleep recovery time in the scheduled sleep recovery management table 408. The scheduled sleep recovery time is contained in the sleep permission signal 12 as described above.

After storing the scheduled sleep recovery time, the control unit 404 stops power supply to the photoelectric converter 402 and shifts to a sleep state (S31). The sleep state control module 407 starts the time counter 409 via the control unit 404 (S32).

From then on, as long as the ONU 4 is in a sleep state, uplink frames are stored in the queue buffer 405. The sleep state control module 407 monitors the value of the time counter 409 until the time counter 409 reaches the scheduled sleep recovery time described above (S33).

When the value of the time counter 409 becomes equal to the scheduled sleep recovery time, the sleep state control module 407 shifts the control unit 404 to a normal state (S34). Specifically, when shifted from a sleep state to a normal state, the control unit 404 resumes power supply to the photoelectric conversion 402. This establishes communication with the photoelectric converter 202 of the OLT 2.

After communication is established in S34 between the photoelectric converter 202 of the OLT 2 and the photoelectric converter 402 of the ONU 4, the control unit 404 of the ONU 4 starts counting how much time passes until the sleep state request signal 13 is received from the OLT 2. The control unit 404 determines whether or not the sleep state request signal 13 is received from the OLT 2 until the time counter 409 counts up a given period of time (S35).

In the case where it is determined in S35 that the time counter 409 has counted up the given period of time before the sleep state request signal 13 is received from the OLT 2, it means that the OLT 2 does not permit a shift to a sleep state, and the ONU 4 thus returns to S21 to return to a normal state.

In the case where it is determined in S35 that the sleep state request signal 13 has been received from the OLT 2 before the time counter 409 counts up the given period of time, the control unit 404 of the ONU 4 causes the sleep control signal processing module 406 to analyze the received sleep state request signal 13. From the result of the analysis, the control unit 404 recognizes that the sleep state request signal 13 is a request for the ONU 4 to reply to the OLT 2 about whether or not the ONU 4 is to shift to another sleep state.

In order to determine whether or not to shift to another sleep state, the control unit 404 of the ONU 4 refers to the queue buffer 405 and determines whether or not an uplink frame has been received during a sleep state (S36).

In the case where it is determined in S36 that there have been no uplink frames received, the control unit 404 returns to S24 and generates the sleep time request signal 11 in order to shift to another sleep state. The generated sleep time request signal 11 is transmitted to the OLT 2 (S24 and S25). The control unit 404 then shifts to a sleep state (S26 to S33).

The control unit 404 may obtain the UNI link speed and the buffer capacity when returning from S36 to S24 to determine a new sleep time in S24.

In the case where it is determined in S36 that there have been uplink frames received, the control unit 404 causes the sleep control signal processing module 404 to generate the sleep recovery request signal 14 and transmits the sleep recovery request signal 14 via the photoelectric converter 402 to the OLT 2, in order to recover from a sleep state and return to a normal state (S37). Receiving the sleep recovery request signal 14, the OLT 2 generates the grant signal 15 and transmits the generated grant signal 15 to the photoelectric converter 402 of the ONU 4. Receiving the grant signal 15 (S38), the ONU 4 returns to a normal state.

Figure 6:
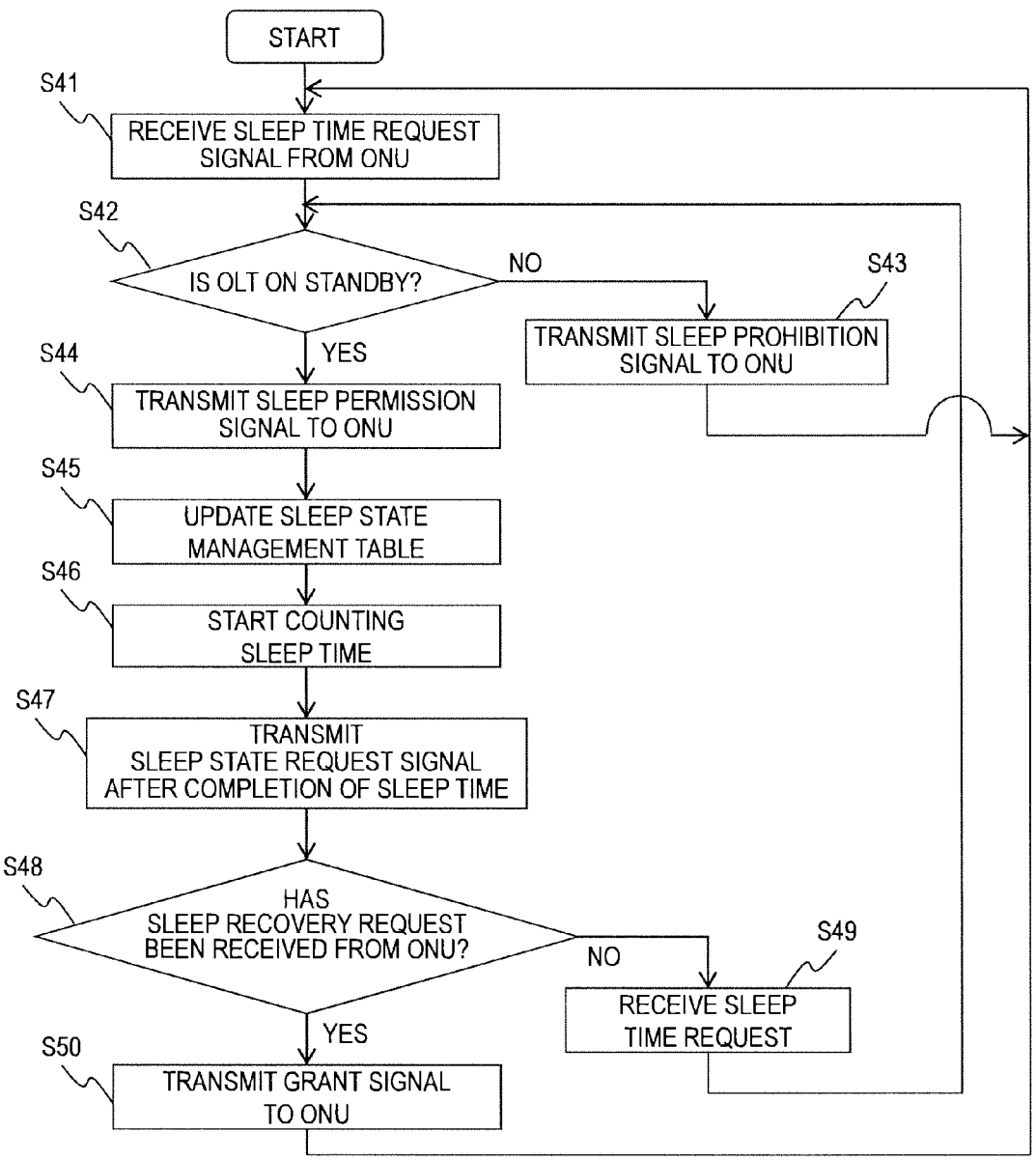
FIG. 6 is a flow chart illustrating processing of the OLT to shift the ONU to a sleep state and return the ONU from the sleep state according to the embodiment of this invention.

FIG. 6 is a flow chart illustrating processing that is executed by the OLT 2 to shift one of the ONUs 4 to a sleep state and return the ONU 4 from the sleep state according to the embodiment of this invention.

In the case where the sleep time request signal 11 is received from the ONU 4 in a normal state (S41), the control unit 204 of the OLT 2 determines whether or not a downlink frame destined to the ONU 4 that has transmitted the sleep time request signal 11 is found in the queue buffers 205 (S42).

In the case where a downlink frame destined to the ONU 4 is found in the queue buffers 205, the control unit 204 causes the sleep control signal processing module 207 to generate the sleep prohibition signal 16 in order to prevent the ONU 4 from shifting to a sleep state. The generated sleep prohibition signal 16 is transmitted by the photoelectric converter 202 to the ONU 4 that has transmitted the sleep time request signal 11 (S43). The OLT 2 then returns to a normal state to wait for the sleep time request signal 11.

In the case where no downlink frames destined to the ONU 4 are found in the queue buffers 205 in S42, the control unit 204 causes the sleep control signal processing module 207 to generate the sleep permission signal 12 in order to shift the ONU 4 to a sleep state. The generated sleep permission signal 12 is transmitted to the ONU 4 that has transmitted the sleep time request signal 11 (S44).

The OLT 2 then stores in the sleep state management table 208 information to the effect that the ONU 4 to which the sleep permission signal 12 is transmitted is in a sleep state (S45). In S45, the OLT 2 also stores a scheduled sleep recovery time in the scheduled sleep recovery time management table 209 as described above with reference to FIG. 4.

The control unit 204 starts the time counter 210 (S46) and waits for the elapse of a sleep time.

After the time counter 210 counts up the sleep time, the control unit 204 causes the sleep control signal processing module 207 to generate the sleep state request signal 13 in order to make an inquiry to the ONU 4 about whether or not the ONU 4 is to shift to another sleep state. The generated sleep state request signal 13 is sent to the ONU 4 that has been in a sleep state (S47).

The control unit 204 then determines whether or not the sleep recovery request signal 14 has been received from the ONU 4 (S48). In the case where the sleep recovery request signal 14 is not transmitted from the ONU 4, it means that the ONU 4 does not shift to a sleep state, and the OLT 2 thus receives the sleep time request signal 11. The OLT 2 then returns to S42.

In the case where it is determined in S48 that the sleep recovery request signal 14 has been received from the ONU 4, the control unit 204 transmits the grant signal 15 to the ONU 4 (S50) and returns to a normal state.

Figures 7, 8:
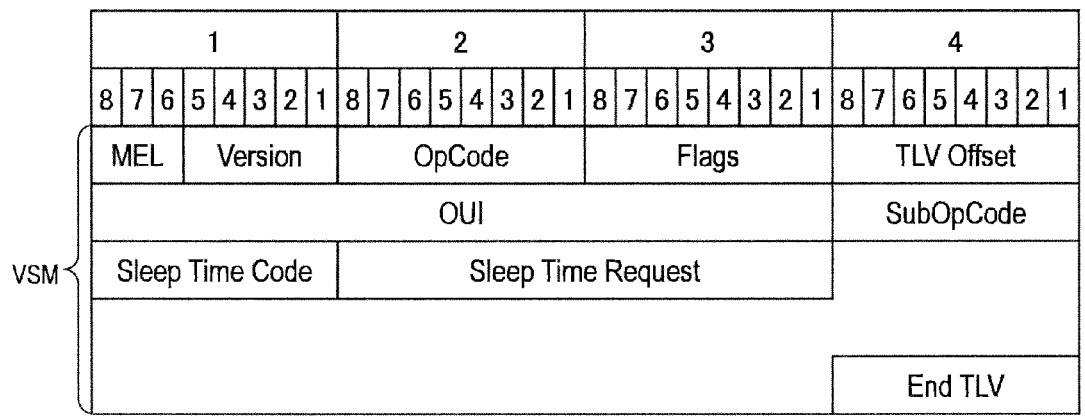
FIG. 7 is an explanatory diagram illustrating the sleep time management table of the ONU according to the embodiment of this invention.
FIG. 8 is an explanatory diagram illustrating a frame format of the sleep control signals transmitted/received between the OLT and the ONU according to the embodiment of this invention.

FIG. 7 is an explanatory diagram illustrating the sleep time management table 410 which is provided in each of the ONUs 4 according to the embodiment of this invention.

The sleep time management table 410 of FIG. 7 holds a maximum sleep time of the ONU 4 based on the UNI link speed and queue buffer capacity of the ONU 4. Values of the sleep time management table 410 are stored in advance by an administrator or the like.

When the buffer capacity is larger, the ONU 4 can hold more uplink frames and, accordingly, a longer time is set as the maximum sleep time in the sleep time management table 410. When the UNI link speed is faster, on the other hand, the ONU 4 receives more uplink frames per unit time, which means that the storing frames in the queue buffer 405 reaches the upper limit more quickly, and a shorter time is therefore set as the maximum sleep time in the sleep time management table 410.

For example, in the case where the UNI link speed of the electric transceiver 401 of the ONU 4 is 1 Gbit/s and the capacity of the queue buffer 405 is 1 Gbit, the ONU 4 of this embodiment has a maximum sleep time of 1 second. In the case where the UNI link speed of the electric transceiver 401 of the ONU 4 is 100 Mbit/s, the maximum sleep time is 10 seconds.

A value stored in the sleep time management table 410 of this embodiment is a maximum sleep time in the ideal network where the traffic utilization ratio is 100%. The traffic utilization ratio may be taken into account in determining the value of the maximum sleep time.

Similarly, in the case where the UNI link speed of the ONU 4 is 1 Gbit/s and the capacity of the queue buffer 405 is 100 Mbit, the maximum sleep time is 0.1 seconds. In the case where the capacity of the queue buffer 405 is 10 Mbit, the maximum sleep time is 0.01 seconds.

FIG. 8 is an explanatory diagram illustrating a frame format of the sleep control signals transmitted/received between the OLT 2 and the ONUs 4 according to the embodiment of this invention.

The frame format used for the sleep control signals of this embodiment is Ethernet Operations, Administration, and Maintenance (Ethernet OAM) defined by ITU-T Y.1731.

A protocol data unit (PDU) of the frame format according to Ethernet OAM is defined to contain a maintenance entity group level (MEL) field, a version field, an operation code (OpCode) field, a flags field, and a type-length-value (TLV) field.

The sleep control signals of this embodiment are transmitted and received with the use of an optional VSM data field of a vendor-specific OAM message (VSM) frame. The VSM field is a field that each vendor can use uniquely.

The PDU in a VSM frame can hold information unique to the vendor in fields by the vendor defining an Organizationally Unique Identifier (OUI) field and a SubOpCode field in addition to the fields described above.

In this embodiment, a sleep time identifier (STI) field and a request sleep time (RST) field are provided in the optional VSM data field in order to transmit and receive the sleep control signals. The STI field contains an identifier for identifying whether the sleep control signal that is transmitted or received is the sleep time request signal 11, the sleep permission signal 12, the sleep state request signal 13, the sleep recovery request signal 14, the grant signal 15, or the sleep prohibition signal 16. The RST field contains the maximum sleep time of the ONU 4, and a value defined by the sleep time management table 410 is stored in the RST field.

According to this embodiment, each ONU 4 selects as long a time as possible for the ONU 4 to have as the maximum sleep time and enters a sleep state, thereby reducing the power consumption of the ONU 4 and improving the utilization ratio. The ONU 4 has the sleep time management table 410 based on its own UNI link speed and queue buffer capacity to select a maximum sleep time.

While the present invention has been described in detail and pictorially in the accompanying drawings, the present invention is not limited to such detail but covers various obvious modifications and equivalent arrangements, which fall within the purview of the appended claims.

What is claimed is:

1. An optical access system, comprising:
   an optical line terminal coupled to a network; and
   optical network units coupled to the optical line terminal and to a plurality of user terminals, each of the optical network units being configured to:
      obtain a capacity of a buffer included in each of the respective optical network units and a link speed between each of the respective optical network units and one of the plurality of user terminals that is coupled to each of the respective optical network units;
      determine a sleep time based on the obtained capacity and the obtained link speed in a case where no communication frames are transmitted for a given period of time from any one of the plurality of user terminals and the optical line terminal; and
      set in a sleep state for the determined sleep time,
   wherein each of the respective optical network units is configured to transmit the determined sleep time to the optical line terminal,
   wherein the optical line terminal is configured to transmit a permission of setting in the sleep state to each of the respective optical network units after receiving the determined sleep time,
   wherein each of the respective optical network units is configured to be set in the sleep state after receiving the permission of setting in the sleep state from the optical line terminal,
   wherein each of the respective optical network units is configured to transmit the determined sleep time to the optical line terminal in a case where the communication frames transmitted from the one of the plurality of user terminals to each of the respective optical network units are not stored in the buffer included in each of the respective optical network units after the determined sleep time elapses since the setting to the sleep state,
   wherein the optical line terminal includes a buffer for storing the communication frames to be transmitted from the optical line terminal to the one of the plurality of user terminals, and
   wherein the optical line terminal is configured to transmit the permission of setting in the sleep state to each of the respective optical network units in a case where the communication frame is not stored in the buffer of the optical line terminal after receiving the determined sleep time.

2. The optical access system according to claim 1,
   wherein each of the respective optical network units is configured to transmit a permission of returning from the sleep state to the optical line terminal in a case where it is determined that the communication frames to be transmitted from the one of the plurality of user terminals to each of the respective optical network units are stored in the buffer of each of the respective optical network units after the determined sleep time elapses.

3. The optical access system according to claim 1,
   wherein the sleep time is longer when the obtained buffer capacity is larger, and is shorter when the obtained link speed is faster.

* * * * *